Sept. 30, 1941.     H. VOHRER     2,257,355
METHOD FOR ATTACHING COUPLINGS TO HOSE
Filed Nov. 7, 1938
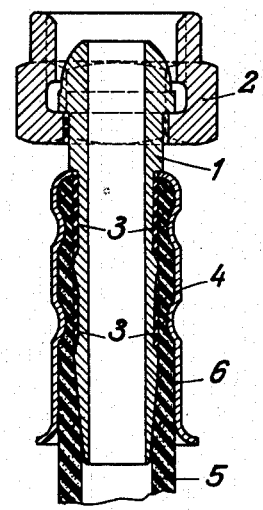
Inventor:
Herbert Vohrer,
Bailey & Pearson
Attorneys Patented Sept. 30, 1941

2,257,355

UNITED STATES PATENT OFFICE 2,257,355

METHOD FOR ATTACHING COUPLINGS TO HOSE

Herbert Vohrer, Berlin, Germany, assignor to E. I. du Pont de Nemours and Company, Wilmington, Del., a corporation of Delaware Application November 7, 1938, Serial No. 239,354
In Germany November 16, 1937

5 Claims. (Cl. 18—59)

My invention relates to elastic and flexible high-pressure hoses provided with a coupling nipple, and more particularly to such hoses made from a mixture of a highly polymerized vinyl composition such as polyvinyl alcohol, polyvinyl chlorid or mixed polymerisates of different polymerizable vinyl compositions or the like, with a softening agent, such as glycerine, or glycol, or the like.

The object of the invention is to provide a method for manufacturing a hose and nipple combination of the above described type which can be easily made, and which can withstand very high internal pressures.

Another object of the invention is to provide a method for manufacturing a coupling nipple for high-pressure hoses of the above described type which is ready to be attached to the hose in a very simple manner, and which enables to achieve a connection between hose and nipple which is able to withstand at least the breakdown pressure of the hose itself.

According to the present invention the coupling nipple is connected to the high-pressure hose made from a mixture of a highly polymerized vinyl composition with a softening agent by means of an intermediate layer consisting of a hard variety of the hose material one side of said layer engaging the recesses of the nipple and the other side thereof being glued or welded to the inner wall of the end of the hose mounted on the nipple. Thus an extremely firm connection is obtained since the hard intermediate layer can not glide off the nipple and, on the other hand, this layer, due to its isomerism with the hose material, sticks so firmly to the hose that it has been found that at extreme internal pressures the hose is more liable to a breakdown than the connection of the hose to the nipple.

The invention is illustrated in the accompanying drawing.

Referring to the drawing, the metal nipple 1 which carries a screw nut 2 for coupling the hose to a metal pipe is provided with a number of recesses 3 which are engaged by the hard intermediate layer 4. The female hose end 5 is welded to the layer 4 in a manner to be described further down.

The nipple provided with the hard intermediate layer can be made by pressing upon the recessed parts of the nipple, at elevated temperature, rings consisting of the hose material, or of a similar material, but not containing any softening agent. When dried, such rings will become completely hard due to the absence of softening agents, and they can not be pulled off the nipple by any force.

Another process for providing the nipple with the hard intermediate layer consists in cutting off a piece of the hose itself, drawing this piece upon the nipple, and dissolving the softening agent from the hose material by means of a suitable solvent. For instance, in the case of a hose consisting of a mixture of polymerized vinyl chloride and tricresylic phosphate the softening agent can be dissolved from the hose material by means of benzol.

In order to obtain a very firm adherence of the hose piece drawn upon the nipple to the nipple body it is advantageous to use a hose piece the inner diameter of which is as wide as or even smaller than the diameter of the thinnest part of the nipple body. For facilitating the application of the hose piece to the nipple the hose piece can be softened prior to its application by means of an agent causing the base material of the hose to swell. Eventually, at the same time also the softening agent can be dissolved from the hose piece so that after the application of the hose piece to the nipple it is only necessary to dry it to obtain the desired hard intermediate layer. If, for example in the case of a hose consisting of a mixture of polyvinyl alcohol and glycerine or glycol, the hose piece to be applied to the nipple is put for some time into cold or lukewarm water then the water causes swelling of the polyvinyl alcohol and, consequently, softening of the hose piece, and simultaneously it dissolves the water-soluble softening agent from the hose material. Now the hose piece can easily be applied to the nipple and, after drying, will form a completely hard layer on it.

For attaching the hose to the nipple the end of the hose as well as the hard layer on the nipple are subjected to the action of a solvent adapted to dissolve the base material of the hose and the material of the hard layer on the nipple, for instance hot water or steam. As soon as the surface of the end of the hose and of the hard layer on the nipple is dissolved to a certain degree the end of the hose is drawn upon the nipple and then the joint is subjected to dry heat or simply dried in dry air; herewith the surfaces of the hose end and of the intermediate layer on the nipple are firmly welded together and can not be separated any more.

What I claim is:

1. The process of attaching a metal coupling nipple to a flexible hose consisting of a mixture of a highly polymerized vinyl composition with a softening agent comprising coating the portion of the nipple to be inserted into the hose end with a ring consisting substantially of the hose material and containing a soluble softening agent, dissolving the softening agent out of the said ring by means of a suitable solvent, drying the coating so as to harden it, superficially dissolving said coating and the end of the hose by means of a solvent acting upon the base component of the hose material, inserting the coated portion of the nipple into the end of the hose, and drying the jointed parts.

2. In a process for uniting a metallic coupling nipple provided with locking recesses with an elastic and flexible high-pressure hose consisting of a mixture of highly polymerized vinyl composition with a softening agent with the aid of an intermediate layer which engages the locking recesses upon one side and is united with the inner surface of the flexible hose upon the other side, the steps comprising drawing a softened piece of a hose over the metal nipple which is of substantially the same highly polymerized vinyl composition as contained in the flexible hose to be united with the metal nipple, hardening such piece of hose and uniting the outer surface thereof with the inner surface of the flexible hose.

3. In a process for uniting a metallic coupling nipple provided with locking recesses with an elastic and flexible high-pressure hose consisting of a mixture of highly polymerized vinyl composition with a softening agent with the aid of an intermediate layer which engages the locking recesses upon one side and is united with the inner surface of the flexible hose upon the other side, the steps comprising drawing a piece of hose containing a soluble softening agent and having substantially the same composition as the flexible hose to be united with the metal nipple over the nipple, dissolving the softening agent out of the piece of hose drawn over the nipple, drying such piece of hose and uniting the outer surface thereof with the inner surface of the flexible hose.

4. In a process for uniting a metallic coupling nipple provided with locking recesses with an elastic and flexible high-pressure hose consisting of a mixture of highly polymerized vinyl composition with a softening agent with the aid of an intermediate layer which engages the locking recesses upon one side and is united with the inner surface of the flexible hose upon the other side, the steps comprising treating a piece of hose containing a soluble softening agent and having substantially the same composition as the flexible hose to be united with the metal nipple with a swelling agent for the highly polymerized vinyl compound contained therein, drawing the swollen piece of hose over the metal nipple, dissolving the softening agent out of the hose, drying such piece of hose and uniting the outer surface thereof with the inner surface of the flexible hose.

5. In a process for uniting a metallic coupling nipple provided with locking recesses with an elastic and flexible high-pressure hose consisting of a mixture of highly polymerized vinyl composition with a softening agent with the aid of an intermediate layer which engages the locking recesses upon one side and is united with the inner surface of the flexible hose upon the other side, the steps comprising treating a piece of hose containing a soluble softening agent and having the same composition as the flexible hose to be united with the metal nipple with a swelling agent, dissolving the softening agent out of the piece of hose, then drawing the piece of hose over the metal nipple, drying such piece of hose and uniting the outer surface thereof with the inner surface of the flexible hose.

HERBERT VOHRER.